(12) United States Patent
Peirce

(10) Patent No.: US 7,299,846 B2
(45) Date of Patent: Nov. 27, 2007

(54) TOOL FOR REMOVING MATERIAL STRIP FROM SURFACE

(75) Inventor: Steven James Peirce, Uniontown, OH (US)

(73) Assignee: Bridgestone Firestone North American Tire, LLC, Nashville, TN (US)

( * ) Notice: Subject to any disclaimer, the term of this patent is extended or adjusted under 35 U.S.C. 154(b) by 274 days.

(21) Appl. No.: 10/981,172

(22) Filed: Nov. 4, 2004

(65) Prior Publication Data
US 2006/0090847 A1 May 4, 2006

(51) Int. Cl.
*B32B 38/10* (2006.01)

(52) U.S. Cl. .................... 156/584; 156/344; 254/203; 254/210; 254/211; 294/902; 242/571; 242/572

(58) Field of Classification Search ............... 242/571, 242/572, 573.8; 156/344, 584; 254/200, 254/203, 209, 210, 211; 294/103.1, 902
See application file for complete search history.

(56) References Cited

U.S. PATENT DOCUMENTS

| | | | | |
|---|---|---|---|---|
| 1,281,861 A | * | 10/1918 | Sibley | 242/573.6 |
| 1,973,980 A | * | 9/1934 | Graffenberger | 242/573.3 |
| 2,066,659 A | | 1/1937 | Templeton et al. | |
| 2,297,648 A | * | 9/1942 | Cushman | 242/573.5 |
| 2,587,885 A | * | 3/1952 | Paxson | 242/573.8 |
| 2,721,042 A | * | 10/1955 | Betz | 242/571 |
| 3,625,013 A | * | 12/1971 | Guild et al. | 405/247 |
| 4,500,046 A | | 2/1985 | Woenker | |
| 5,465,922 A | * | 11/1995 | Vander Groef | 242/573 |
| 5,509,619 A | * | 4/1996 | Struwe et al. | 242/573.2 |
| 5,904,315 A | * | 5/1999 | McInerney | 242/571 |
| 6,095,704 A | * | 8/2000 | Jaeger et al. | 400/613 |
| 6,199,616 B1 | | 3/2001 | Gillespie | |
| 6,227,479 B1 | | 5/2001 | Dean et al. | |
| 6,554,217 B1 | * | 4/2003 | Rodriguez | 242/362 |
| 6,745,974 B2 | * | 6/2004 | Nelson | 242/573.4 |
| 2003/0188833 A1 | | 10/2003 | Adleman, Jr. | |

FOREIGN PATENT DOCUMENTS

DE 3002831 * 7/1981
JP 57 009660 A 1/1982

* cited by examiner

*Primary Examiner*—Mark A Osele
(74) *Attorney, Agent, or Firm*—Fred H. Zollinger, III; Thomas R. Kingsbury

(57) ABSTRACT

A tool is used to remove a material strip from a surface. The tool has a collapsible body configurable in expanded and collapsed configurations. The expanded configuration allows the strip to be wound about the body while the strip is being removed from a surface. While the strip is wrapped about the body, the body may be collapsed to the collapsed configuration and then removed from the inside of the rolled strip.

15 Claims, 15 Drawing Sheets

TOOL FOR REMOVING MATERIAL STRIP FROM SURFACE

BACKGROUND OF THE INVENTION

1. Technical Field

The present invention generally relates to tools. More particularly, the present invention relates to a hand tool used to remove a strip of material from a surface. Specifically, the invention is related to a collapsible tool

2. Background Information

There are numerous applications wherein a strip of material must be removed from a surface. In the tire testing art, strips of material are formed into belts of friction material by securely adhering the strips to thin metal belts that are rotated to function as test surfaces. The belts simulate road surfaces and are relatively expensive. Tires are engaged with the test surfaces and one or both of the tire and test surface move to simulate driving forces on the tire. The belts of friction material are typically securely attached to the test surface with an adhesive. When the user needs to change the type of friction material or when the friction material wears out, the operator must remove the belt of friction material from the test surface and install a new belt. Removing the belt of friction material is not easy, especially after a tire has traveled the equivalent of thousands of miles on the surface. Machine operators have been forced to remove the belts section by section with a small hand-held scraper in a manner similar to removing old wallpaper without the benefit of a wallpaper removal chemical. One drawback with the scraping tool is the amount of time necessary to remove the large belts. Another drawback is the potential damage to the expensive test surfaces. A further drawback is the potential injury to the operator's hands. Another method of removing the belt of friction material is to wind the belt of material around the bar. A drawback with using a tool in this method is the difficulty in removing the wound belt from the tool. A significant amount of force is needed to remove the belt from the test surface and this force winds the belt tightly about the tool and tightly to itself. The belts often become so tightly wound to the bar that a hammer is needed to force the bar out from within the wound belt.

Operators who must remove these belts as part of their day-to-day activities desire a tool that helps remove the belts in large portions so that the scraping is eliminated. These operators also desire a tool that is easy to remove from the wound belt after the belt is removed from the test surface.

SUMMARY OF THE INVENTION

In one embodiment, the invention provides a tool for removing a material strip from a surface. The tool has a collapsible body configurable in expanded and collapsed configurations. The expanded configuration allows the strip to be wound about the body while the strip is being removed from a surface. While the strip is wrapped about the body, the body may be collapsed to the collapsed configuration and then removed from the inside of the rolled strip.

In another embodiment, the invention provides a tool for removing a material strip from a surface wherein the tool includes a collapsible body configurable in expanded and collapsed configurations with the expanded configuration of the body allowing the material strip to be wrapped about the body directly from the surface to form a wrapped material strip. The body being collapsible from the expanded configuration to the collapsed configuration after the material strip has been wrapped about the body with the collapsed condition of the body allowing the body to be removed from the wrapped material strip. The body includes front and rear barrels that support a drum while the barrels are removable from the drum. One of the barrels defines a first longitudinal opening and the other of the barrels defines a second longitudinal opening. A threaded connector is disposed through the first longitudinal opening and threadedly engages the other of the barrels with the longitudinal position of the threaded connector being fixed with respect to the first longitudinal opening such that rotation of the threaded connector in a first direction drives the front and rear barrels toward each other and rotation of the threaded connector in a second direction drives the front and rear barrels away from each other.

In one embodiment, the tool includes a pair of drum sections that cooperate to form a slot that receives the leading end of the strip that is to be removed from the surface. The drum sections are supported by interlocked front and rear barrels. One of the barrels has a drive that cooperates with a drive tool used to turn the tool to wind the strip about the drum sections.

Another embodiment of the invention provides a tool for removing a material strip from a surface wherein the tool includes a collapsible body configurable in expanded and collapsed configurations. The body includes front and rear barrels that support a flexible non-metal drum with the drum having opposite ends. Each of the barrels has a flange with the ends of the drum abutting the flanges. A connector is disposed through portions of each of the barrels such that rotation of the connector in a first direction drives the front and rear barrels toward each other causing the flexible non-metal drum to move to the expanded configuration and rotation of the connector in a second direction drives the front and rear barrels away from each other allowing the drum to move to the collapsed configuration.

The invention also provides a method of removing a strip from a surface. The method includes the steps of providing a tool having a collapsible body configurable in expanded and collapsed configurations, connecting an end of the strip to be removed to the collapsible body; winding the strip from the surface onto the collapsible body; collapsing the collapsible body; and separating the body from the strip.

BRIEF DESCRIPTION OF THE DRAWINGS

Similar numbers refer to similar parts throughout the specification.

DETAILED DESCRIPTION OF THE INVENTION

Figure 1:
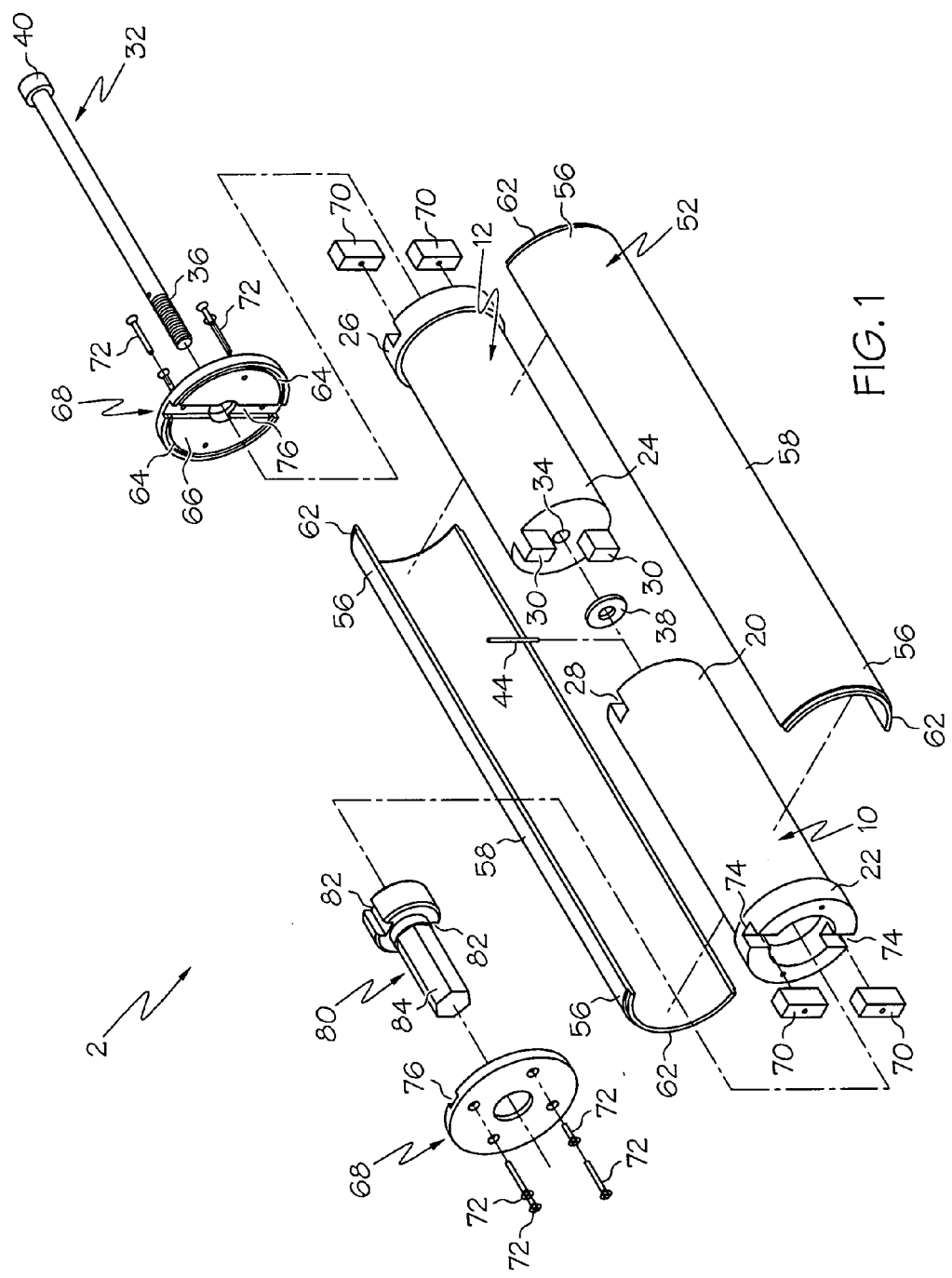
FIG. 1 is an exploded perspective view of the strip removal tool shown from the front or drive end.

Exemplary embodiments of the tool of the invention are indicated generally by the numeral 2 in the accompanying drawings. Tool 2 has a collapsible body configurable in expanded and collapsed positions. The expanded position of the body allows a strip of material 4 to be wound around the body as the strip is removed from a surface 6. The body is collapsible after the strip 4 is wrapped around the body so that the body may be removed from the wrapped strip 4.

The body of tool 2 generally includes a front barrel 10 and a rear barrel 12 that selectively interlock together such that barrels 10 and 12 do not move relative to each other while in use. Barrels 10 and 12 define a longitudinal axis 14 (FIG. 3) about which tool 2 rotates while winding or wrapping strip 4 about tool 2. Front barrel 10 has an inner end 20 and an outer end 22. Rear barrel 12 has an inner end 24 and an outer end 26. In the alternative embodiment of the invention depicted in FIGS. 1A and 2A, barrels 10 and 12 are tapered from the inner ends to the outer ends.

Inner ends 20 and 24 are configured to interlock. Any of a variety of interlocking arrangements may be used to achieve the desired interlocked arrangement. In the exemplary embodiment, inner end 20 of front barrel 10 defines a slot 28 while inner end 24 of rear barrel 12 includes at least one tooth 30 configured to be frictionally or slidingly fit within slot 28. Barrels 10 and 12 thus cannot rotate relative to each other when tooth 30 is disposed in slot 28. A connector 32 is used to prevent barrels 10 and 12 from moving longitudinally with respect to each other. Connector 32 is received in a pair of bores 34 defined by barrels 10 and 12. Barrel 10 has threads that project into bore 34 to threadedly engage fastener 32. Rotation of fastener 32 in one direction pulls barrels 10 and 12 together while fastener 32 in the other direction pushes barrels 10 and 12 apart. A washer 38 may be disposed between inner ends 20 and 24 in recess 39. Fastener 32 has a head 40 that defines a wrench opening 42 that allows a wrench to engage fastener 32 for such rotation. A retaining pin 44 may be used to substantially fix (some movement is permitted—but pin 44 prevents fastener 32 from being pulled through barrel 12) the longitudinal position of fastener 32 with respect to washer 38 and rear barrel 12 so that barrel 12 may be pulled away from barrel 10 with connector 32. Washer 38 also acts as a bearing surface of pin 44 when bolt 32 is rotated.

Figure 1A:
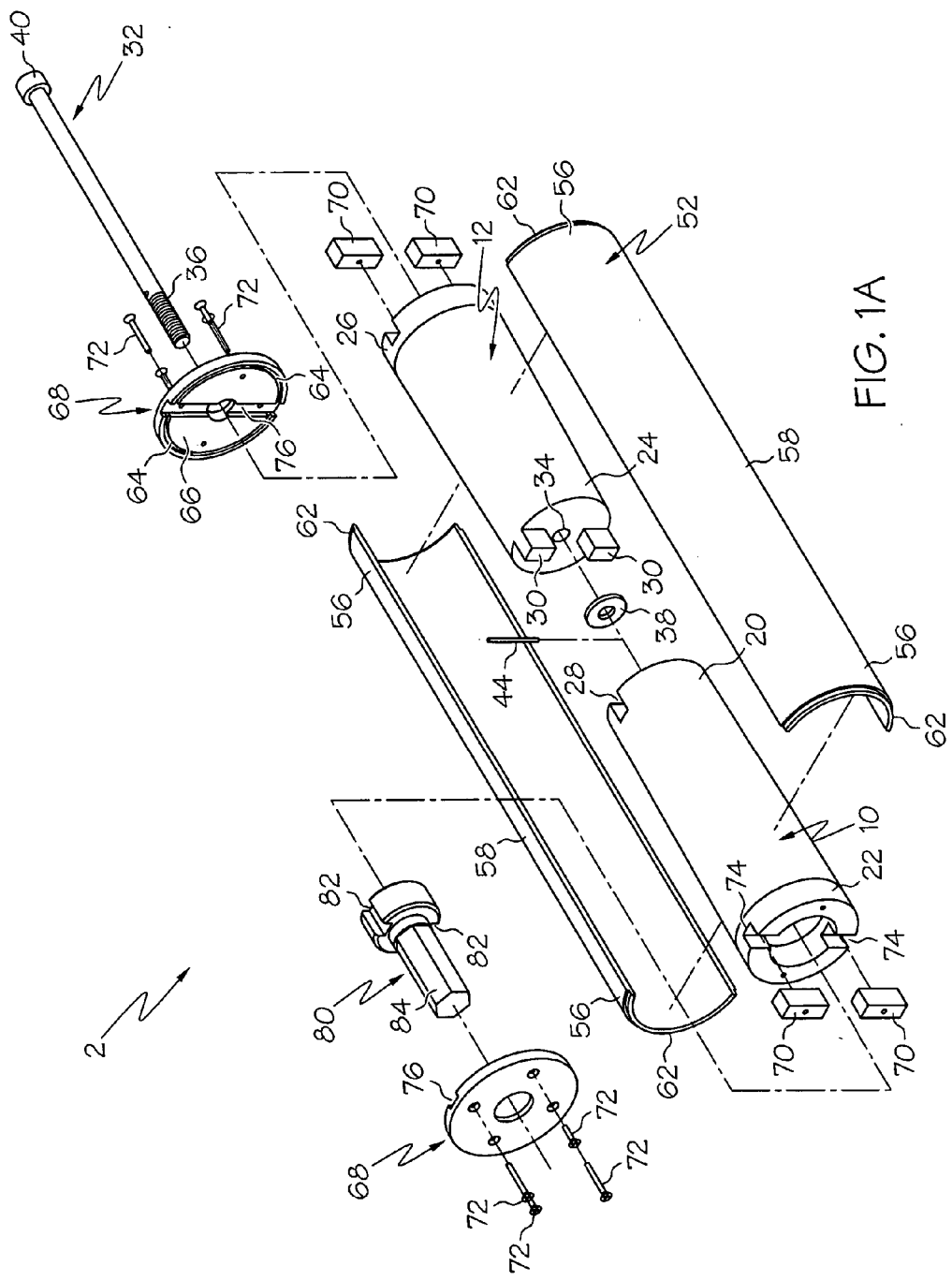
FIG. 1A is an exploded perspective view of one alternative embodiment of the strip removal tool.
Figure 2:
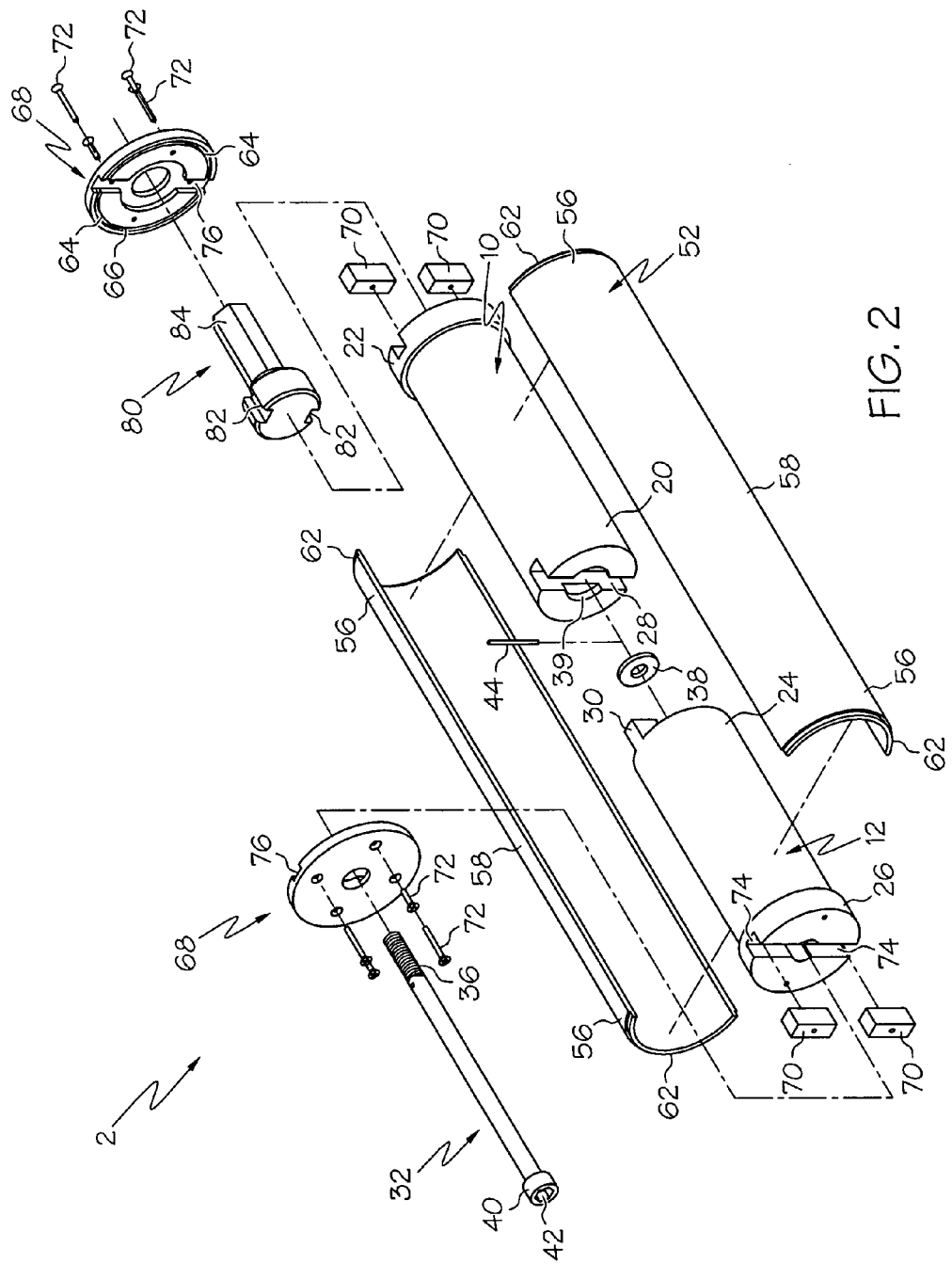
FIG. 2 is an exploded perspective view of the tool shown from the rear end.
Figure 2A:
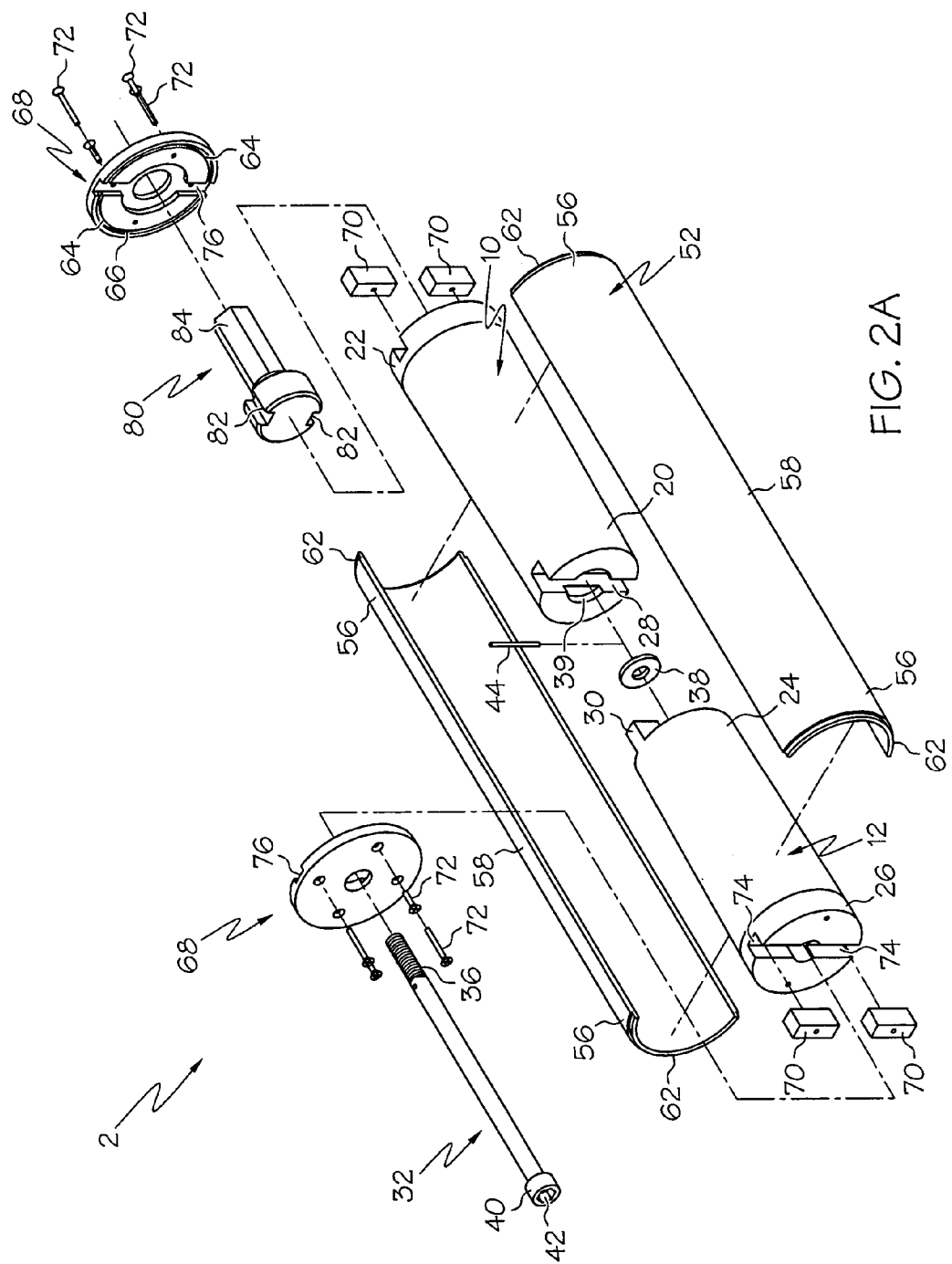
FIG. 2A is an exploded perspective view of the alternative embodiment of the strip removal tool shown in FIG. 1A.

Outer ends 22 and 26 of barrels 10 and 12 define bosses with larger diameters than inner ends 20 and 24. In the embodiment shown in FIGS. 1A and 2A, the bosses are tapered. Outer ends 22 and 26 are used to support a drum 50 having an outer surface around which strip 4 is wrapped. An advantage to using the tapered barrels 10 and 12 of FIGS. 1A and 2A is that outer ends 22 and 26 immediately allow drum 50 to collapse as barrels 10 and 12 start to move apart from each other.

Figure 4:
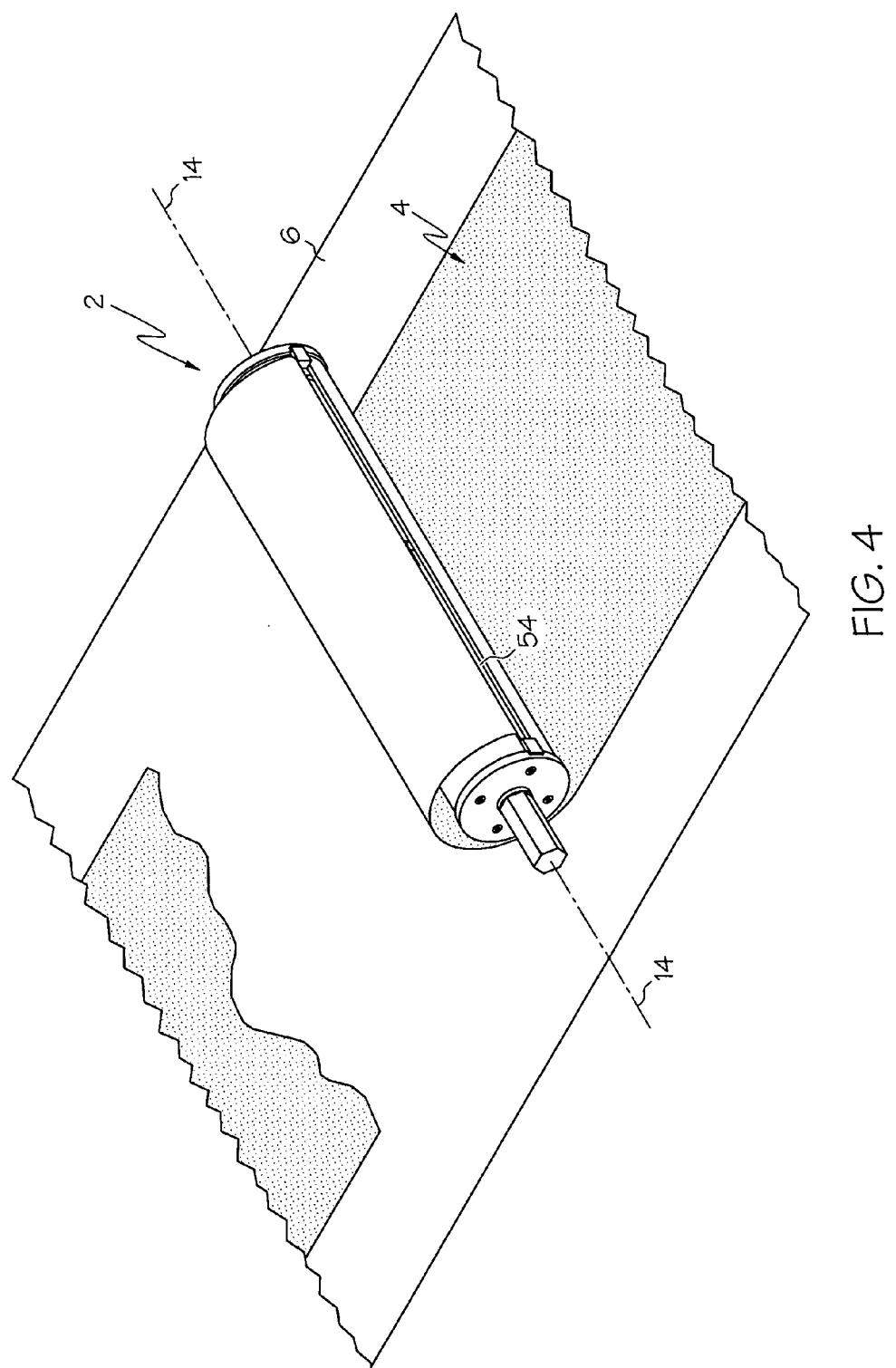
FIG. 4 is a perspective view of the tool with the end of the material strip inserted into the slot between the drum sections.

Drum 50 may be formed by a pair of drum sections 52 that define at least one slot 54. The outer surface of each drum section 52 may be scored with a scoring pattern to create friction between drum 50 and strip 4. Each drum section 52 has outer ends 56 and a middle portion 58. The engagement of outer ends 56 with outer ends 22 and 26 space middle portion 58 away from inner ends 20 and 24 of barrels 10 and 12. The spacing provides room for the insertion of the leading edge 60 of strip 4 as shown in FIG. 4.

Figure 3:
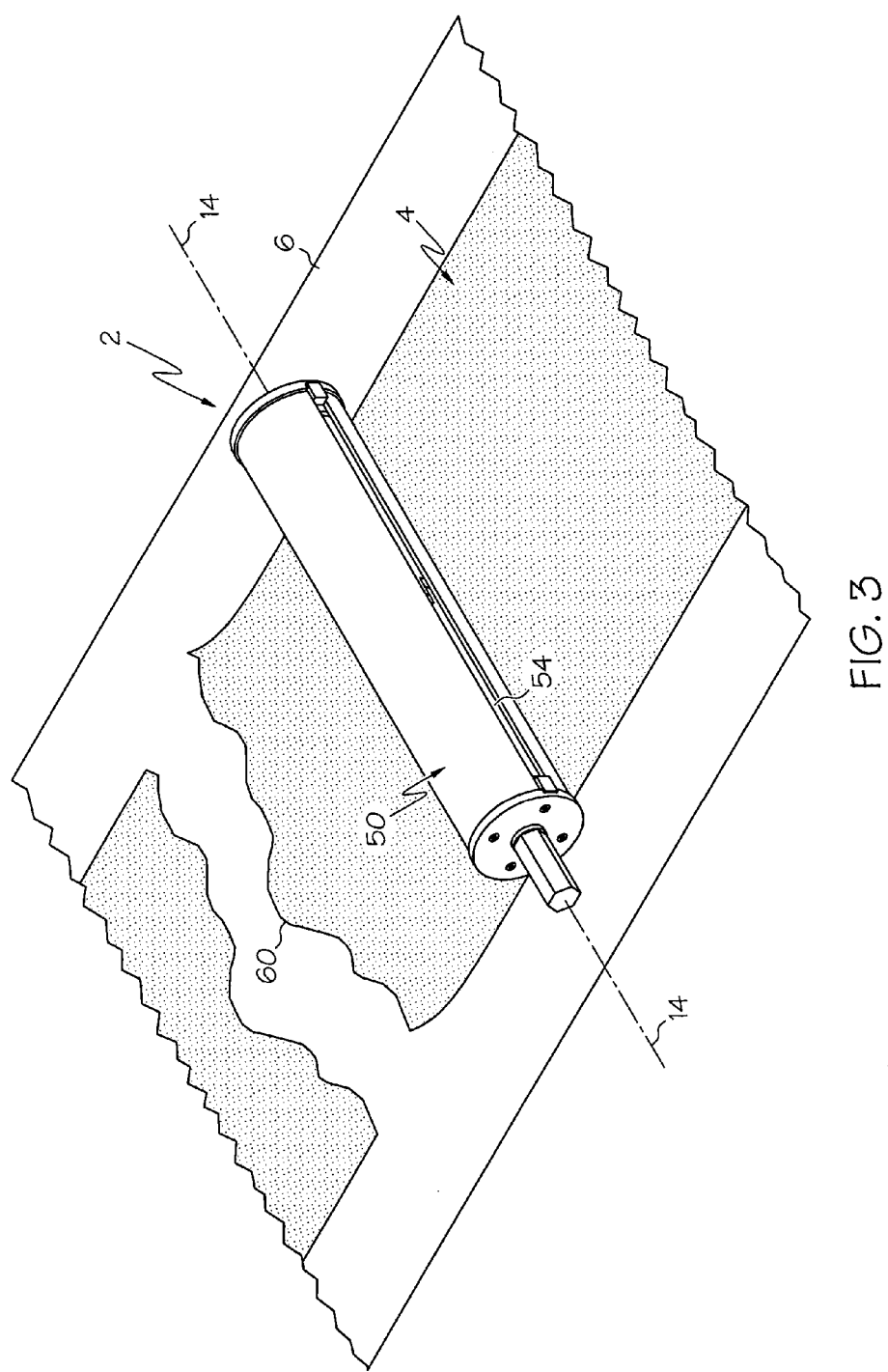
FIG. 3 is a perspective view of the tool positioned adjacent an end of the strip that is secured to a test surface.

Each outer end 56 of each drum section 52 defines a ledge 62 of reduced thickness sized to fit within a groove 64 defined by the inner surface 66 of a retaining flange 68. Flanges 68 are similar except that the flange used with barrel 10 has a larger central opening as shown in the drawings. Retaining flanges 68 are used to cap barrels 10 and 12 and to lock drum sections 52 in place. Keys 70 are used to lock drum sections 52 against rotation with respect to barrels 10 and 12. Fasteners 72 are used to connect retaining flanges 68 to barrels 10 and 12 and to fix drum sections 52 between opposed retaining flanges 68. In the exemplary embodiment, two fasteners 72 extend directly through flange 68 into a barrel 10 or 12 and two fasteners 72 extend through keys 70. Each key 70 is fit within a slot 74 defined by barrels 10 and 12. Keys 70 also fit within slots 76 defined by retaining flanges 68. FIG. 3 shows the position of keys 70 with respect to drum sections 52 to lock the position of drum sections 52 with respect to barrels 10 and 12.

Keys 70 are also used to connect front barrel 10 a drive member 80. Drive member 80 defines a pair of slots 82 that receive portions of keys 70. Drive member 80 includes an arm 84 having a hexagonal outer surface adapted to be fit within a wrench 86 (FIG. 5) that is used to turn tool 2 while wrapping strip 4.

Figure 5:
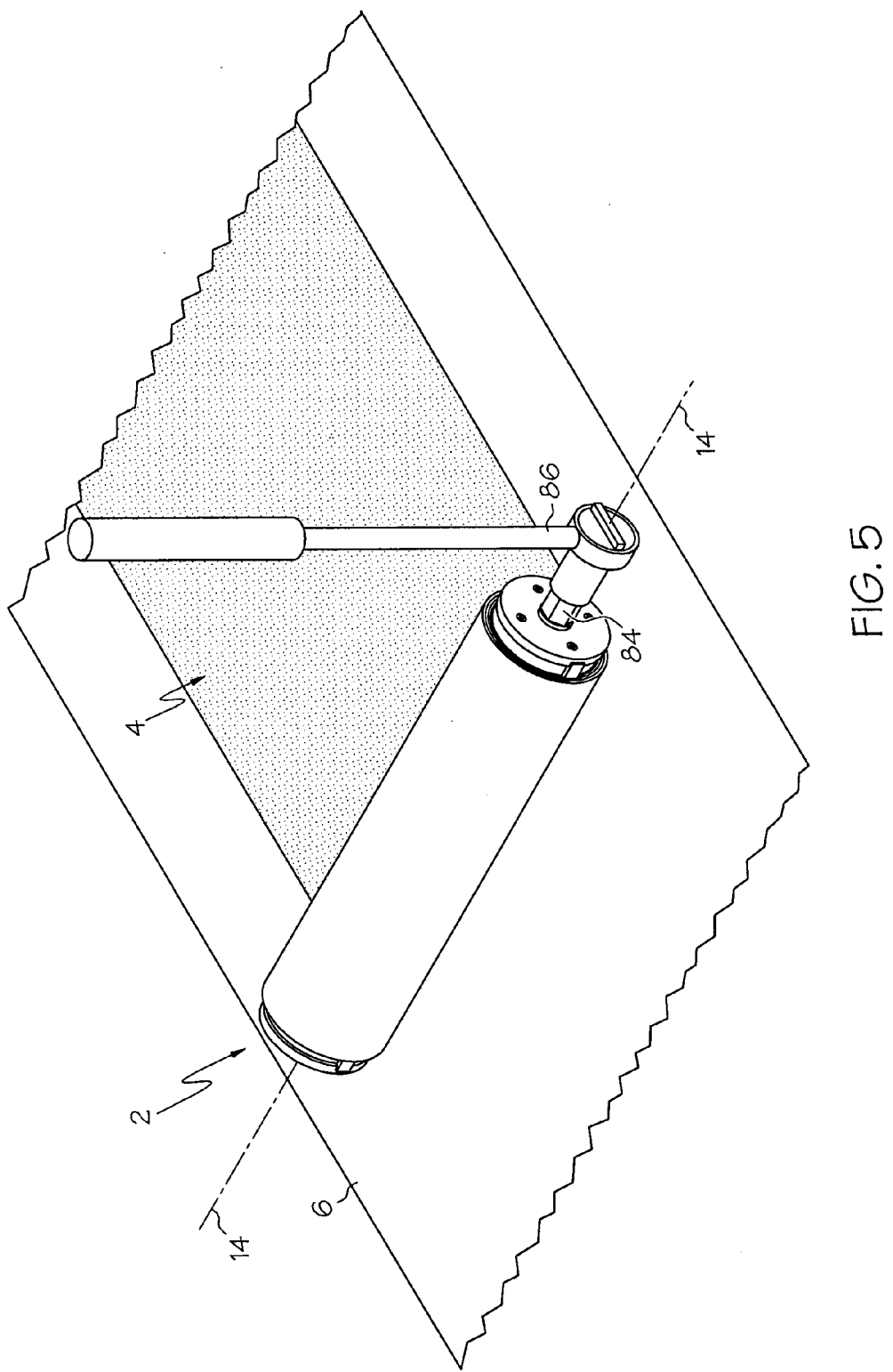
FIG. 5 is a perspective view showing a drive tool attached to the drive end of the tool with a portion of the material strip wrapped around the tool.
Figure 6:
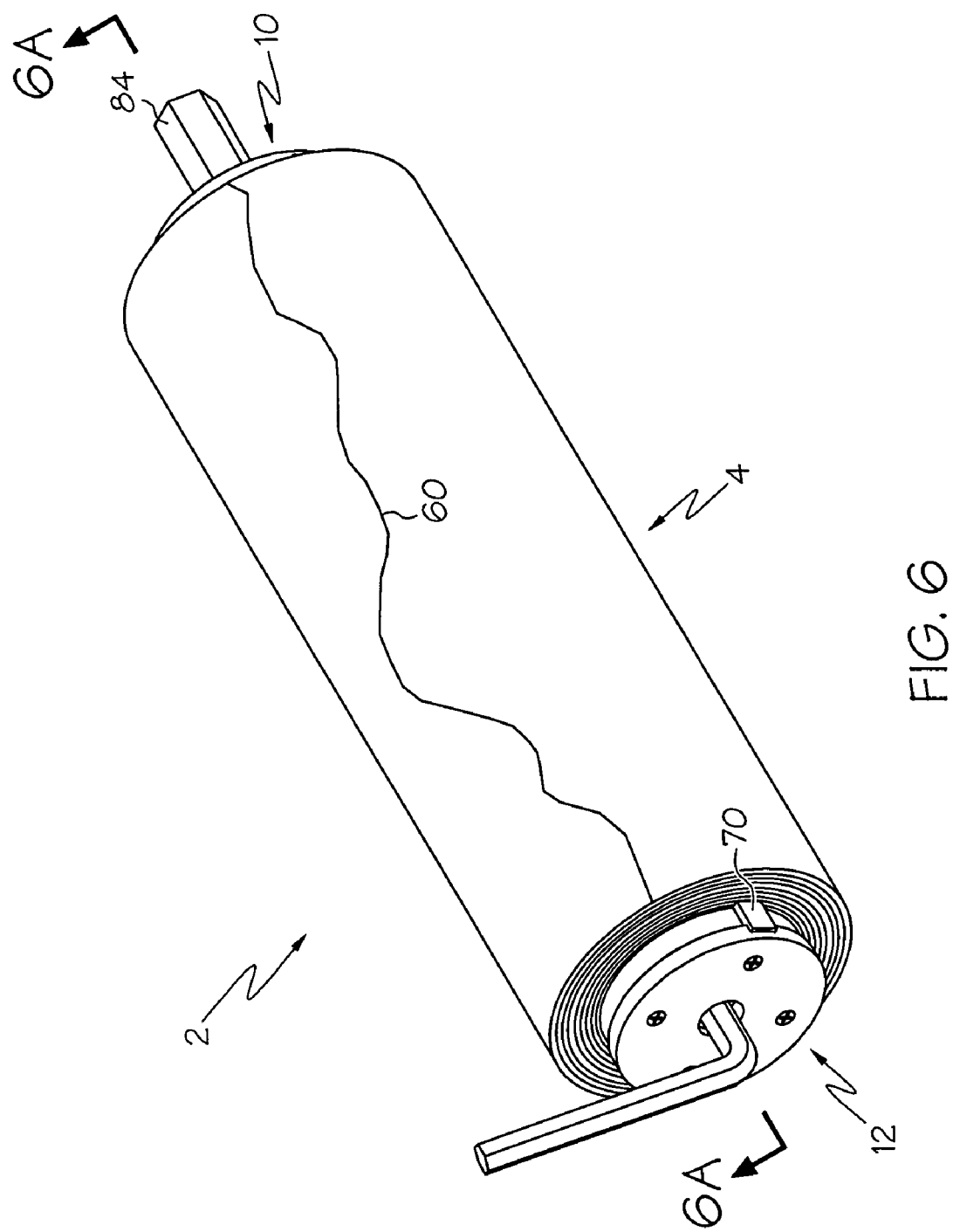
FIG. 6 is a perspective view of the tool with the entire strip of material wrapped around the tool.
Figure 6A:
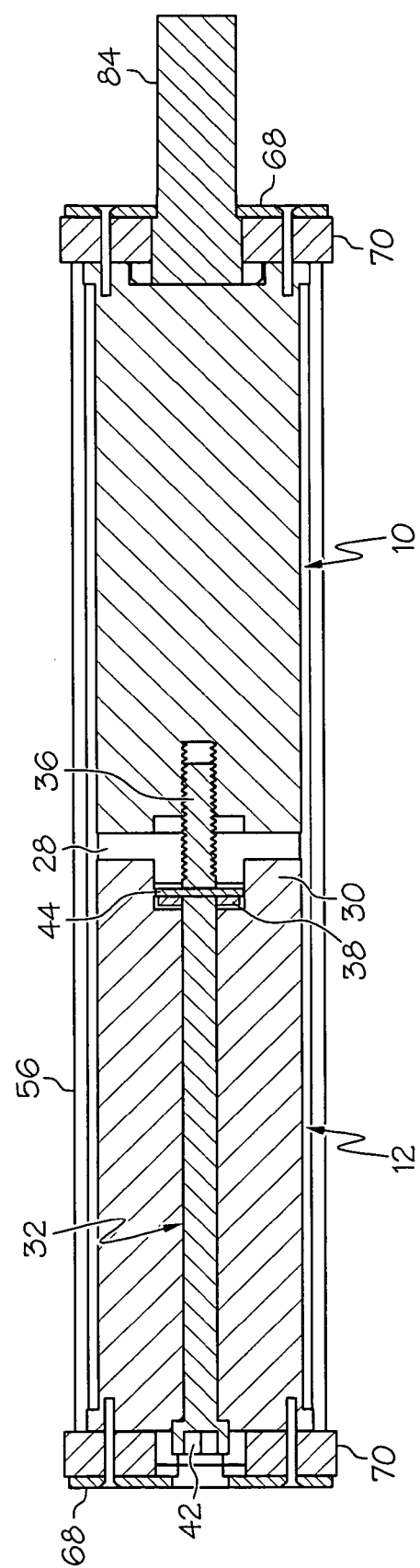
FIG. 6A is a section view of the tool taken along line 6A-6A of FIG. 6.
Figure 7:
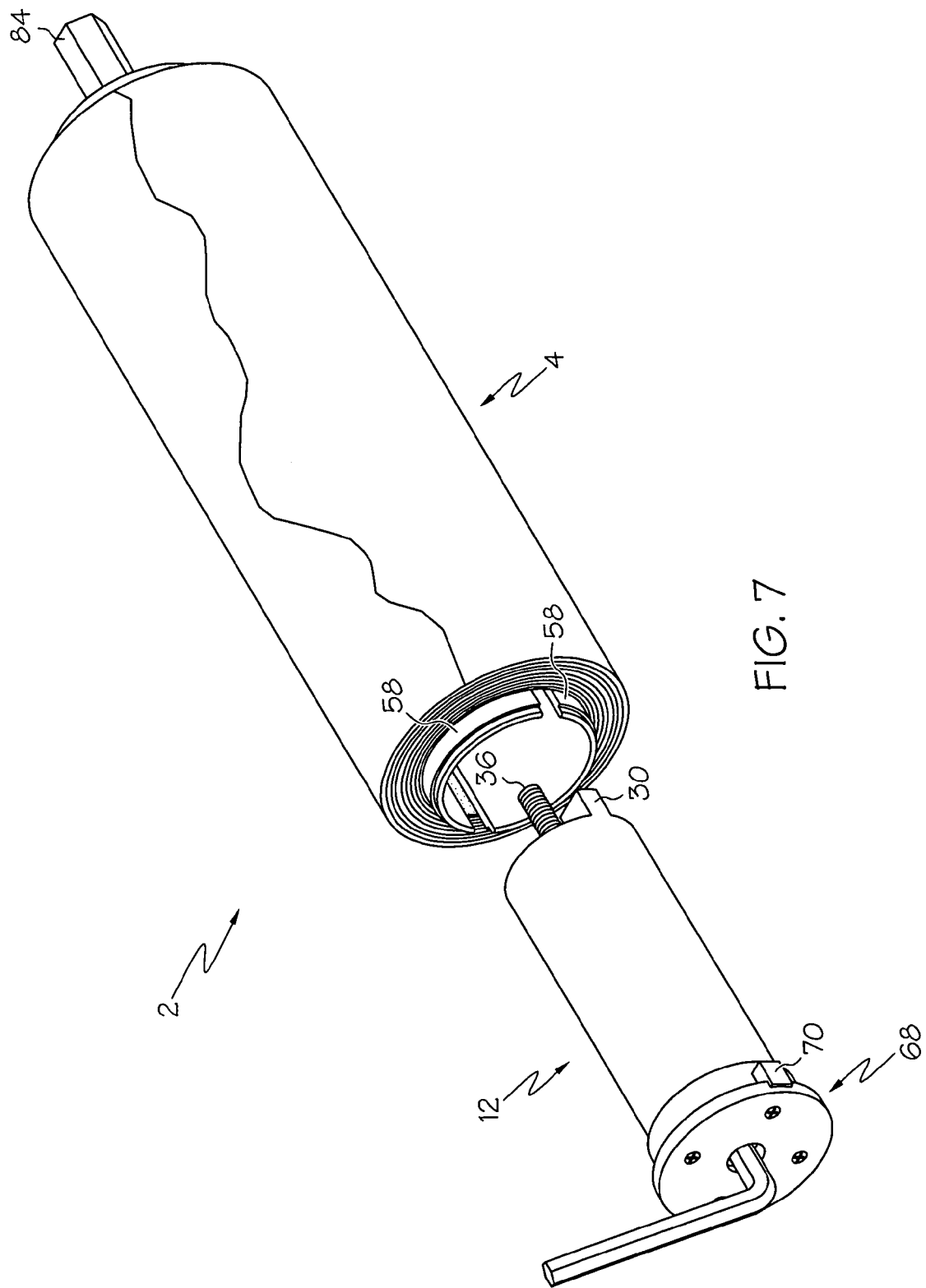
FIG. 7 is a perspective view showing the rear barrel being removed from the drum while the material strip is disposed around the tool.
Figure 8:
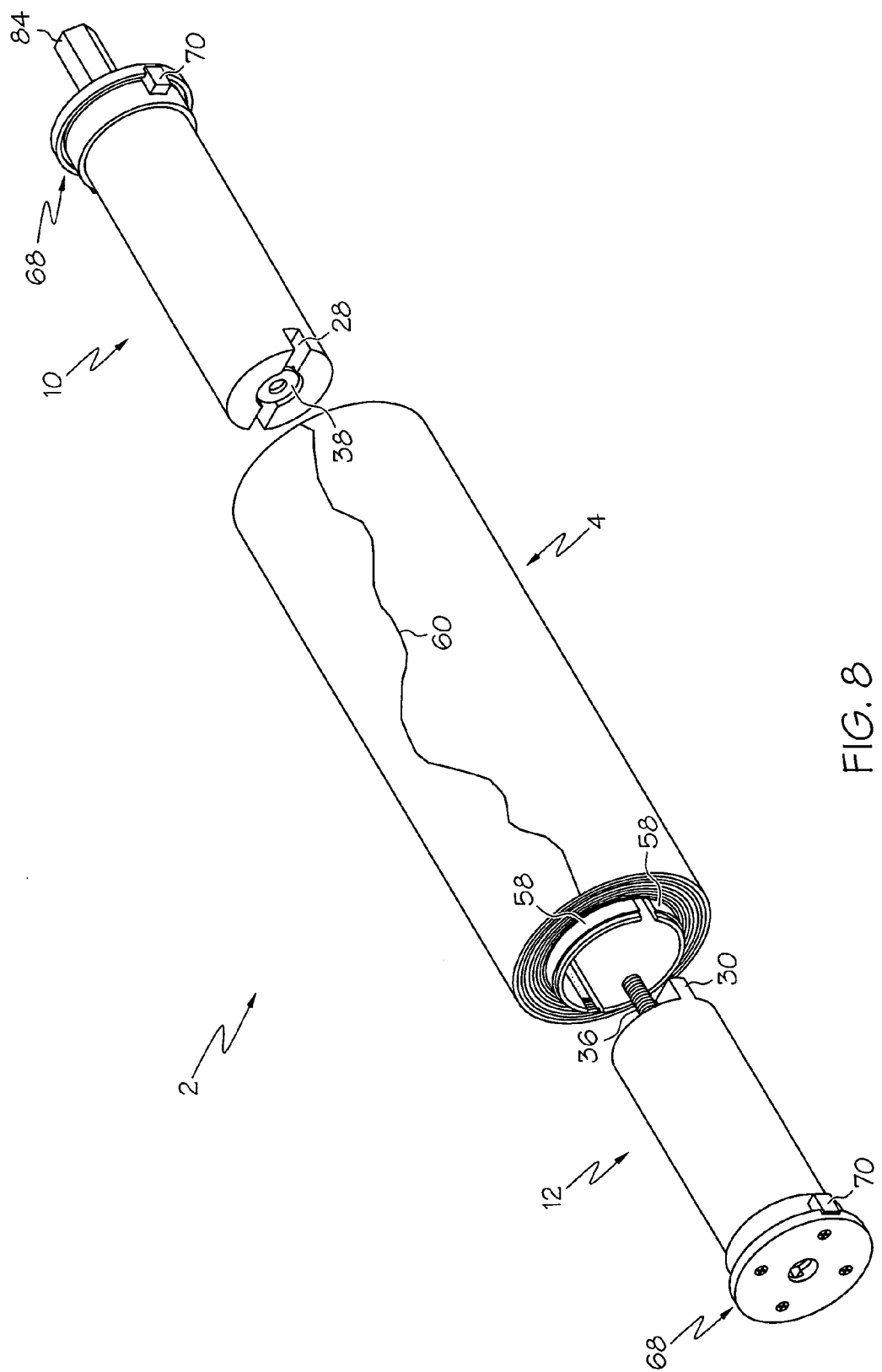
FIG. 8 is a perspective view showing the front and rear barrels removed from the drum sections while the material strip is disposed around the tool.
Figure 9:
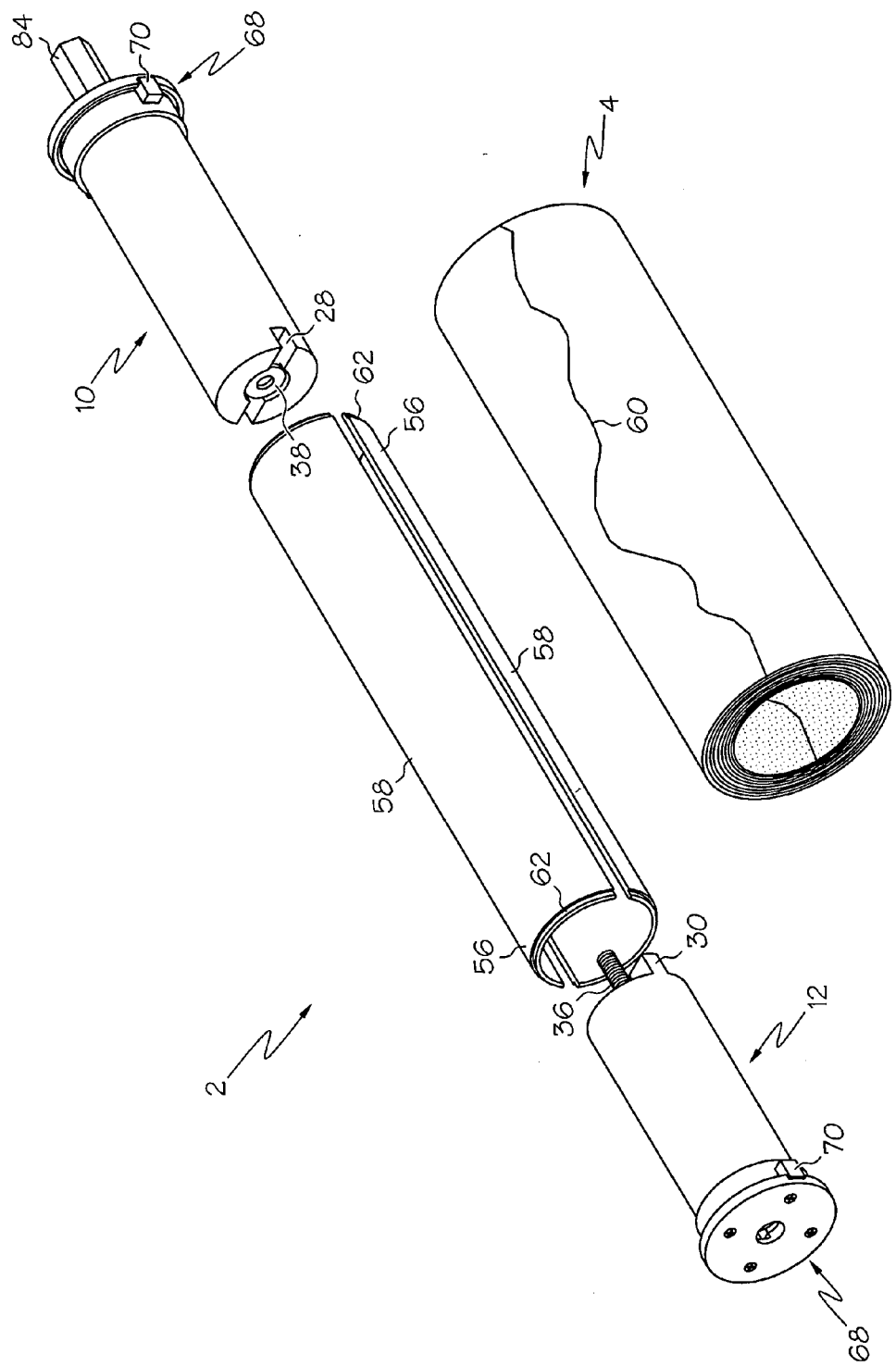
FIG. 9 is a perspective view showing the drum sections removed from the rolled material strip.
Figure 10:
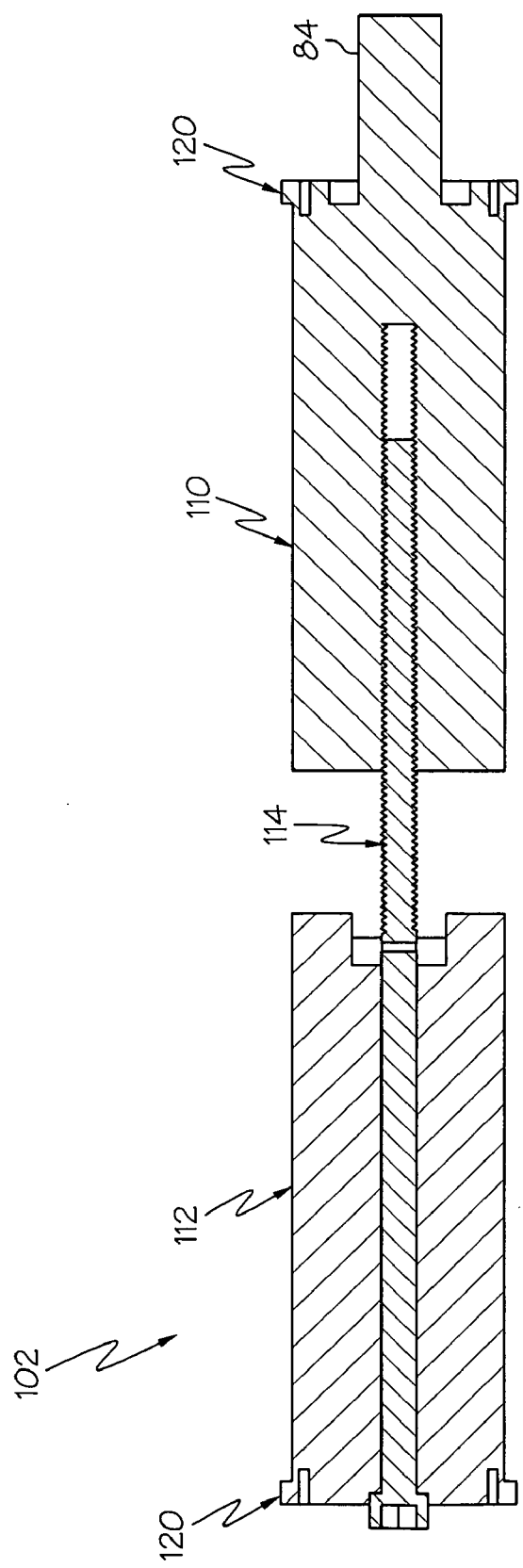
FIG. 10 is a section view of an alternative embodiment of the strip removal tool showing the front and rear barrels and the bolt used to collapsed and expand the tool.

Tool 2 is used by placing assembled tool 2 across strip 4 near leading edge 60 as shown in FIG. 3. Leading edge 60 has already been loosened from surface 6 with an appropriate tool. The user then wraps leading edge 60 about a portion of tool 2 and inserts edge 60 into slot 54 as shown in FIG. 4. In cases where the adhesive holding strip 4 to surface 6 is strong, wrench 86 is used to rotate tool 2 as shown in FIG. 5 to wrap strip 4 around tool 2. Tool 2 is rotated until strip 4 is removed from surface 6 as shown in FIG. 6. The user then collapses tool 2 so that it may be removed from wrapped strip 4 and reused on another strip of material. In order to collapse the exemplary embodiment of the invention, the user rotates connector 32 with respect to barrel 12 to force barrels 10 and 12 apart. Rear barrel 12 may then be removed from drum sections 52 as shown in FIG. 7. Front barrel 10 is then removed from drum sections 52 to allow sections 52 to collapse. Drum sections 52 are then removed as shown in FIG. 10 to completely separate tool 2 from the wrapped strip 4. Tool 2 may then be reassembled and used again.

Figure 11:
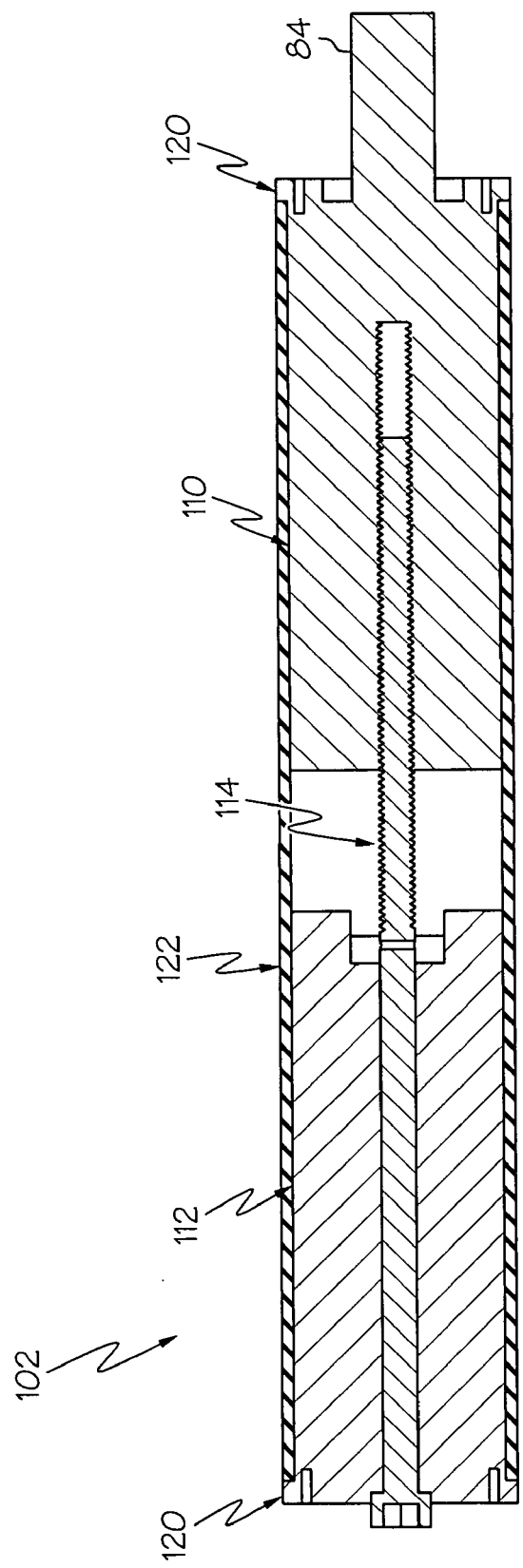
FIG. 11 is a section view of the alternative embodiment of the tool of FIG. 1 showing the collapsed sleeve is cross section and the barrels in elevation.
Figure 12:
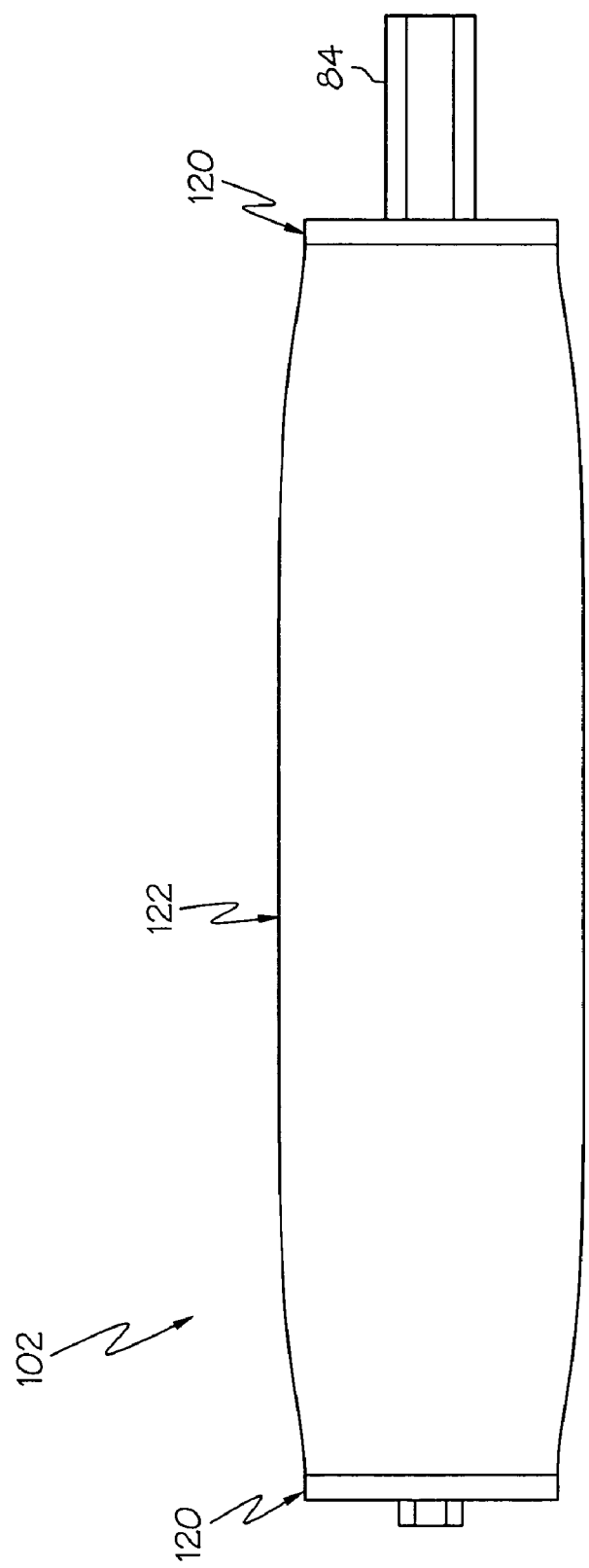
FIG. 12 is an elevation of the alternative embodiment of the tool in the expanded position.

Another alternative embodiment of the invention is indicated generally by the numeral 102 in FIGS. 10-12. Tool 102 has a collapsible body configurable in expanded and collapsed positions. The expanded position of the body allows a strip of material 4 to be wound around the body as the strip is removed from a surface 6. The body is collapsible after the strip 4 is wrapped around the body so that the body may be removed from the wrapped strip 4.

The body of tool 102 generally includes a front barrel 110 and a rear barrel 112 that selectively move back and forth with respect to each other on an adjustment bolt 114. Bolt 114 may threadedly engage barrel 110 as shown in the drawings such that rotation of bolt 114 drives barrels 110 and 112 toward and away from each other. In an alternative embodiment, bolt 114 may pass entirely through both barrels 110 and 112 to threadedly engage a nut or other threaded portion that is part of one of the barrels. In this embodiment, rotation of bolt 114 with respect to the nut in one direction drives barrels 110 and 112 toward each other. A pin or other device that engages bolt 114 may be used to drive barrels 110 and 112 in the other direction when bolt 114 is rotated in the other direction.

Each barrel 110 and 112 includes a flange 120 that may be integrally formed with its barrel or attached with appropriate connectors. A flexible drum 122 is disposed on barrels 110 and 112 between flanges 120. Drum 122 may be a flexible rubber sleeve having a wall thickness of ¼ inch. The resiliency of drum 122 forces barrels 110 and 112 apart from each other when drum 122 is in the expanded position. The position of drum 122 in FIG. 11 is the collapsed position. Drum 122 is moved to the expanded position of FIG. 12 when bolt 114 is used to drive barrels 110 and 112 toward each other. The outer ends of flexible drum 122 move with barrels 110 and 112 to shorten drum 122 causing drum 122 to expand and to lengthen drum 122 causing drum 122 to collapse.

Tool 102 is thus used in a manner similar to that described above. The operator expands tool 102 to the configuration of FIG. 12 and wraps strip 4 about drum 122. Once fully wrapped, the operator moves tool 102 to the collapsed configuration and slides it from tool 102. In some embodiments, drum 122 will expand to have a sinusoidal outer surface formed by a plurality of annular ribs. These ribs have also been found to be effective for wrapping drum 4.

From the foregoing description, those skilled in the art will recognize that the invention solves many of the problems described above. Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

The invention claimed is:

1. A tool for removing a material strip from a surface; the tool comprising:
    a collapsible body configurable in expanded and collapsed configurations;
    the expanded configuration of the body allowing the material strip to be wrapped about the body directly from the surface to form a wrapped material strip;
    the body being collapsible from the expanded configuration to the collapsed configuration after the material strip has been wrapped about the body; the collapsed condition of the body allowing the body to be removed from the wrapped material strip;
    the body defining a slot adapted to receive a portion of the material strip;
    the body including a pair of drum sections that define the slot; and
    the body including front and rear barrels that support the drum sections; the barrels being removable from the drum sections; each of the barrels having an inner end and an outer end; the inner ends of the barrels being interlocked to prevent relative rotation between the barrels; the interlocked barrels defining a longitudinal axis.

2. The tool of claim 1, wherein the barrels support the drum sections with portions of the drum sections spaced from the barrels.

3. The tool of claim 2, further comprising a drive connected to one of the barrels; the drive extending outwardly away from the drum sections.

4. The tool of claim 1, wherein the drum sections are connected to the barrels with first and second keys.

5. The tool of claim 4, further comprising front and rear retaining flanges; the front retaining flange being connected to the front barrel and the rear retaining flange being connected to the rear barrel; the first key disposed between the front barrel and the front retaining flange; and the second key disposed between the rear barrel and the rear retaining flange.

6. The tool of claim 5, wherein each of the retaining flanges defines a slot that receives a portion of each of the drum sections.

7. The tool of claim 4, further comprising a drive member connected to one of the barrels with one of the keys.

8. A tool for removing a material strip from a surface; the tool comprising:
    a collapsible body configurable in expanded and collapsed configurations;
    the expanded configuration of the body allowing the material strip to be wrapped about the body directly from the surface to form a wrapped material strip;
    the body being collapsible from the expanded configuration to the collapsed configuration after the material strip has been wrapped about the body; the collapsed configuration of the body allowing the body to be removed from the wrapped material strip;
    the body including front and rear barrels and a flexible rubber drum; the flexible rubber drum being supported on the front and rear barrels;
    the flexible rubber drum having outer ends;
    one of the barrels defining a first longitudinal opening;
    the other of the barrels defining a second longitudinal opening; and
    a threaded connector disposed through the first longitudinal opening and threadedly engaging the other of the barrels; the longitudinal position of the threaded connector being substantially fixed with respect to the first longitudinal opening such that rotation of the threaded connector in a first direction drives the front and rear barrels toward each other and rotation of the threaded connector in a second direction drives the front and rear barrels away from each other; the outer ends of the flexible rubber drum moving with the front and rear barrels to shorten the drum causing the drum to expand and to lengthen the drum causing the drum to collapse.

9. A tool for removing a material strip from a surface by wrapping the strip around the tool; the tool comprising:
    a front barrel having an inner end and an outer end;
    a rear barrel having an inner end and an outer end;
    the inner ends of the front and rear barrels being interlocked together against relative rotation and relative longitudinal movement;
    a drum carried by the barrels; the drum defining a slot adapted to receive the leading end of the material strip that is to be removed from the surface;
    the barrel being removable from the drum after the strip is wrapped around the tool; and the drum being collapsible such that the drum is removable from the wrapped strip.

10. The tool of claim 9, wherein the drum has outer ends and a middle portion; the barrels supporting the outer ends of the drum with the middle portion of the drum being spaced from the barrels.

11. The tool of claim 9, further comprising a drive connected to one of the barrels; the drive extending outwardly away from the drum.

12. The tool of claim 9, further comprising front and rear retaining flanges; the front retaining flange being connected to the front barrel and the rear retaining flange being connected to the rear barrel; and the drum disposed between the flanges.

13. The tool of claim 12, wherein each of the retaining flanges defines a slot that receives a portion of the drum.

14. The tool of claim 9, wherein
one of the barrels defines a first longitudinal opening;
the other of the barrels defining a second longitudinal opening; and
a threaded connector disposed through the first longitudinal opening and threadedly engaging the other of the barrels; the longitudinal position of the threaded connector being substantially fixed with respect to the first longitudinal opening such that rotation of the threaded connector in a first direction drives the front and rear barrels toward each other and rotation of the threaded connector in a second direction drives the front and rear barrels away from each other.

15. A tool for removing a material strip from a surface by wrapping the strip around the tool; the tool comprising:

a front barrel having an inner end and an outer end;
a rear barrel having an inner end and an outer end;
the inner ends of the front and rear barrels being interlocked together against relative rotation and relative longitudinal movement;
first and second drum sections carried by the barrel; the drum sections cooperating to define a slot adapted to receive the leading end of the material strip that is to be removed from the surface;
the drum sections having outer ends and middle portions; the outer ends of the drum sections engaging the barrels; the middle portion of each drum section being spaced from the barrels;
first and second keys connecting the drum sections to the barrels;
front and rear retaining flanges;
the front retaining flange being connected to the front barrel and the rear retaining flange being connected to the rear barrel;
the first key disposed between the front barrel, the front retaining flange, and at least one of the drum sections;
the second key disposed between the rear barrel, the rear retaining flange, and at least one of the drum sections;
the barrels being removable from the drum after the strip is wrapped around the tool; and
the drum sections being collapsible such that the drum is removable from the wrapped strip.

* * * * *